US012555920B2

(12) United States Patent
Luther et al.

(10) Patent No.: US 12,555,920 B2
(45) Date of Patent: Feb. 17, 2026

(54) ANTENNA WITH DUAL-FUNCTION ANTENNA STRUCTURE AND ASSOCIATED METHODS

(71) Applicant: EAGLE TECHNOLOGY, LLC, Melbourne, FL (US)

(72) Inventors: Justin Jody Luther, Melbourne, FL (US); Francis E. Parsche, Palm Bay, FL (US); Verlin A. Hibner, Melbourne Beach, FL (US); Gregory M. Jandzio, Melbourne, FL (US); Daniel A. Ramirez, West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 152 days.

(21) Appl. No.: 18/236,044

(22) Filed: Aug. 21, 2023

(65) Prior Publication Data

US 2025/0329936 A1 Oct. 23, 2025

(51) Int. Cl.
*H01Q 15/14* (2006.01)
*H01Q 15/16* (2006.01)
*H01Q 19/19* (2006.01)

(52) U.S. Cl.
CPC .................................. *H01Q 15/16* (2013.01)

(58) Field of Classification Search
CPC ......... H01Q 15/14; H01Q 15/16; H01Q 19/19
See application file for complete search history.

(56) References Cited

U.S. PATENT DOCUMENTS 3,276,022 A 9/1966 Brunner
3,983,560 A * 9/1976 MacDougall ........ H01Q 19/026 343/781 CA
5,451,969 A * 9/1995 Toth ....................... H01Q 19/19 343/781 CA
5,579,024 A 11/1996 Sureau
6,483,464 B2 11/2002 Rawnick et al.
6,512,485 B2 * 1/2003 Luly ...................... H01Q 1/247 343/781 CA
6,512,487 B1 1/2003 Taylor et al.
(Continued)

FOREIGN PATENT DOCUMENTS

CN 110571530 12/2019
CN 212342826 1/2021
(Continued)

OTHER PUBLICATIONS

Luther et al., U.S. Appl. No. 18/236,060, filed Aug. 21, 2023.
ADGM 1304, “Single-pole, four-throw MEMS switch with integrated driver”, Rev H, Feb. 2022, pp. 1-34.

*Primary Examiner* — Tho G Phan
(74) *Attorney, Agent, or Firm* — ALLEN, DYER, DOPPELT, + GILCHRIST, P.A. Attorneys at Law

(57) ABSTRACT

An antenna may include an antenna main reflector having a shape defining a focal area, and a dual-function antenna structure at the focal area defining a first antenna feed at a first frequency and an antenna subreflector at a second frequency. The dual-function antenna structure may include a substrate and an array of antenna elements carried thereby. A second antenna feed is adjacent the antenna main reflector and operable at the second frequency to cooperate with the antenna subreflector and antenna main reflector.

19 Claims, 13 Drawing Sheets

(56) References Cited

U.S. PATENT DOCUMENTS

| | | | | |
|---|---|---|---|---|
| 6,545,645 | B1 * | 4/2003 | Wu | H01Q 25/007 343/781 CA |
| 6,943,745 | B2 | 9/2005 | Rao et al. | |
| 6,958,738 | B1 | 10/2005 | Durham et al. | |
| 6,965,355 | B1 | 11/2005 | Durham et al. | |
| 6,999,044 | B2 | 2/2006 | Durham et al. | |
| 7,009,570 | B2 | 3/2006 | Durham et al. | |
| 7,038,625 | B1 | 5/2006 | Taylor et al. | |
| 7,154,082 | B2 | 12/2006 | Maas | |
| 7,173,577 | B2 | 2/2007 | Brown et al. | |
| 7,221,322 | B1 | 5/2007 | Durham et al. | |
| 7,463,210 | B2 | 12/2008 | Rawnick et al. | |
| 7,839,349 | B1 * | 11/2010 | West | H01Q 15/148 343/781 CA |
| 7,965,252 | B2 | 6/2011 | Shtrom | |
| 8,132,942 | B2 | 3/2012 | Holder et al. | |
| 8,314,749 | B2 | 11/2012 | Shtrom et al. | |
| 9,093,742 | B2 * | 7/2015 | Choiniere | H01Q 19/19 |
| 10,177,434 | B1 | 1/2019 | Sriram et al. | |
| 11,522,286 | B2 | 12/2022 | Marr, Jr. et al. | |
| 11,522,297 | B2 | 12/2022 | Ruhl | |
| 11,522,599 | B2 | 12/2022 | Chen et al. | |
| 11,545,758 | B2 | 1/2023 | Koul et al. | |
| 11,581,639 | B2 | 2/2023 | Turpin et al. | |
| 2005/0030244 | A1 | 2/2005 | Durham et al. | |
| 2005/0099353 | A1 | 5/2005 | Jones et al. | |
| 2010/0007572 | A1 | 1/2010 | Jones et al. | |
| 2020/0091608 | A1 | 3/2020 | Alpman et al. | |
| 2022/0384951 | A1 | 12/2022 | Salas | |
| 2022/0399652 | A1 | 12/2022 | Herrero et al. | |

FOREIGN PATENT DOCUMENTS

| | | |
|---|---|---|
| CN | 110957579 | 5/2021 |
| CN | 114792883 | 7/2022 |
| GB | 2249668 | 5/1992 |
| JP | 57154911 | 9/1982 |
| JP | 2001345624 | 12/2001 |

* cited by examiner

ANTENNA WITH DUAL-FUNCTION ANTENNA STRUCTURE AND ASSOCIATED METHODS

TECHNICAL FIELD

The present disclosure relates to antennas, and, more particularly, to a reflector antenna and associated methods.

BACKGROUND

A frequency selective surface (FSS) may be used as a subreflector 22 in a dual feed antenna 20, as illustrated in FIG. 1. The antenna 20 includes an antenna main reflector 24 having a shape defining a focal area. A first antenna feed 26 operable at a first frequency is positioned at the focal point. A second antenna feed 28 operable at a second frequency is positioned between the antenna main reflector 24 and the FSS subreflector 22.

The first frequency radio signal 30 generated by the first antenna feed 26 passes through the FSS subreflector 22 and is reflected by the antenna main reflector 24. The second frequency radio signal 32 generated by the second antenna feed 28 is reflected by the FSS subreflector 22 which is then reflected by the antenna main reflector 24. The second antenna feed 28 functions as a Cassegrain feed.

The FSS subreflector 22 may be referred to as a spatial filter, and is a periodic surface with two-dimensional arrays of elements arranged on a dielectric substrate. Depending on the configuration of the array elements, a radio signal will either pass through the FSS subreflector 22 or be reflected by the FSS subreflector 22.

The FSS subreflector 22 is a standalone component that has to be built and tested, which adds to the cost of the antenna 20. The FSS subreflector 22 may be cumbersome to implement. A printed circuit with the array elements is applied to a compound curve, which requires stretching. This may result in manufacturing challenges. Another drawback of the FSS subreflector 22 is that it provides less than optimum performance due to leakage of radio signals. There may be frequency regions where radio signals should be reflected by the FSS subreflector 22, but pass through instead.

SUMMARY

An antenna may include an antenna main reflector having a shape defining a focal area, and a dual-function antenna structure at the focal area defining a first antenna feed at a first frequency and an antenna subreflector at a second frequency. The dual-function antenna structure may include a substrate and an array of antenna elements carried thereby. A second antenna feed may be adjacent the antenna main reflector and operable at the second frequency to cooperate with the antenna subreflector and antenna main reflector.

The array of antenna elements may be configured to passively define the antenna subreflector at the second frequency. In other embodiments, the antenna may include a plurality of controllable switches associated with the array of antenna elements to actively define the antenna subreflector at the second frequency.

The array of antenna elements may be configured as an array of dipole antenna elements. Each dipole antenna element may include a medial feed portion and a pair of legs extending outwardly therefrom, with adjacent legs of adjacent dipole antenna elements including respective spaced apart end portions having shapes and relative positioning to provide capacitive coupling between the adjacent dipole antenna elements.

The antenna may be configured with a first set of controllable switches configured to couple together the medial feed portions of the dipole antenna elements. The antenna may be configured with a second set of controllable switches configured to couple together the adjacent end portions of the dipole antenna elements.

Each leg may include an elongated body portion and an enlarged width end portion connected thereto. The spaced apart end portions in adjacent legs may include interdigitated portions.

Another aspect is directed to the dual-function antenna structure as described above. The dual-function antenna structure may be positioned at a focal area of a main reflector. The main reflector may have a second antenna feed associated therewith and is operable at a second frequency. The dual-function antenna structure may include a substrate and an array of antenna elements carried thereby to define a first antenna feed at a first frequency and an antenna subreflector at the second frequency.

Yet another aspect is directed to a method for making a dual-function antenna structure as described above to be positioned at a focal area of a main reflector. The main reflector has a second antenna feed associated therewith and is operable at a second frequency. The method may include forming an array of antenna elements on a substrate to define a first antenna feed at a first frequency and an antenna subreflector at the second frequency.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations may be used to indicate similar elements in different embodiments.

Figure 1:
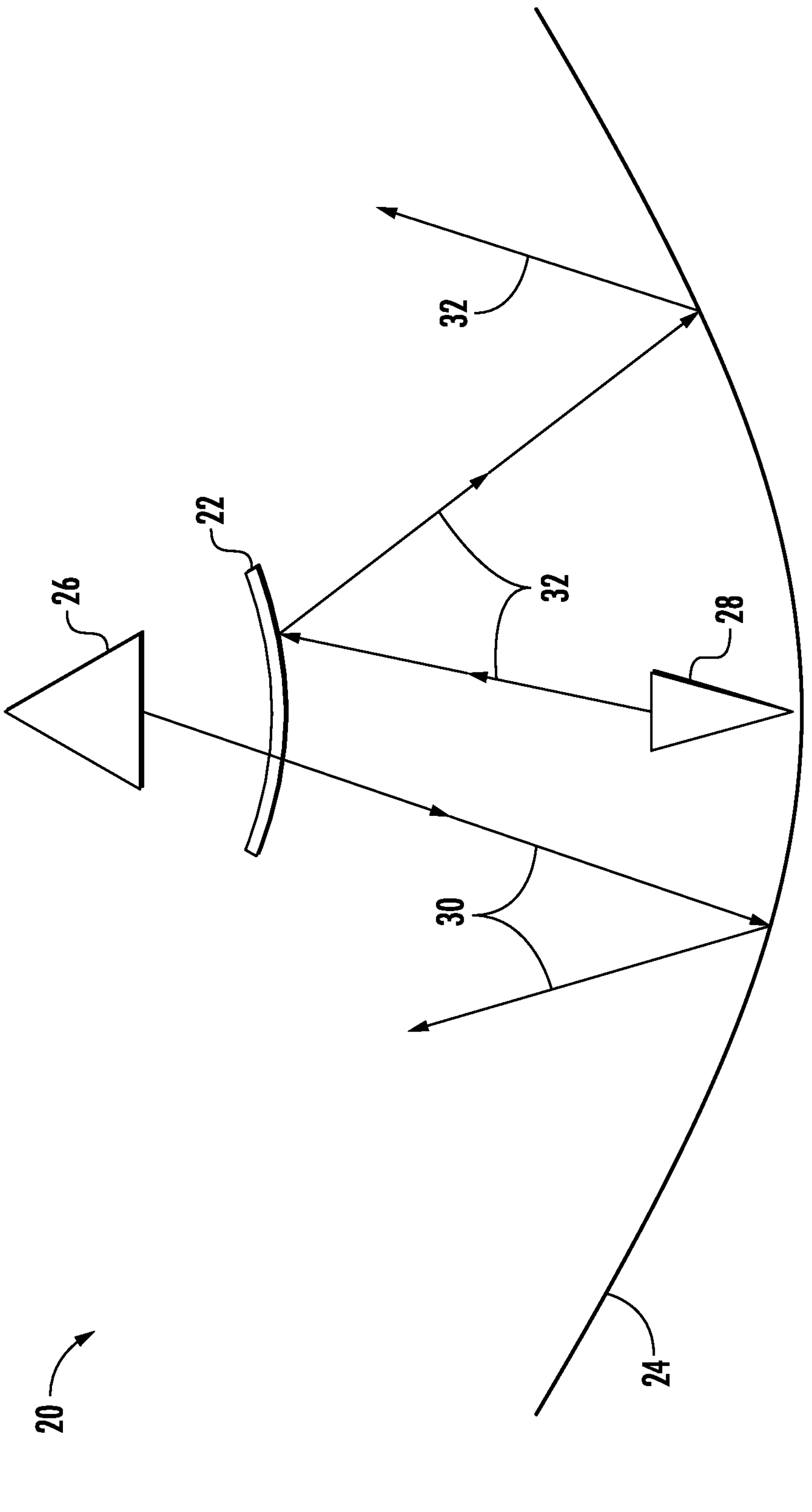
FIG. 1 (PRIOR ART)
FIG. 1 is a schematic diagram of an antenna with a frequency selective surface (FSS) subreflector as in the prior art.
Figure 2:
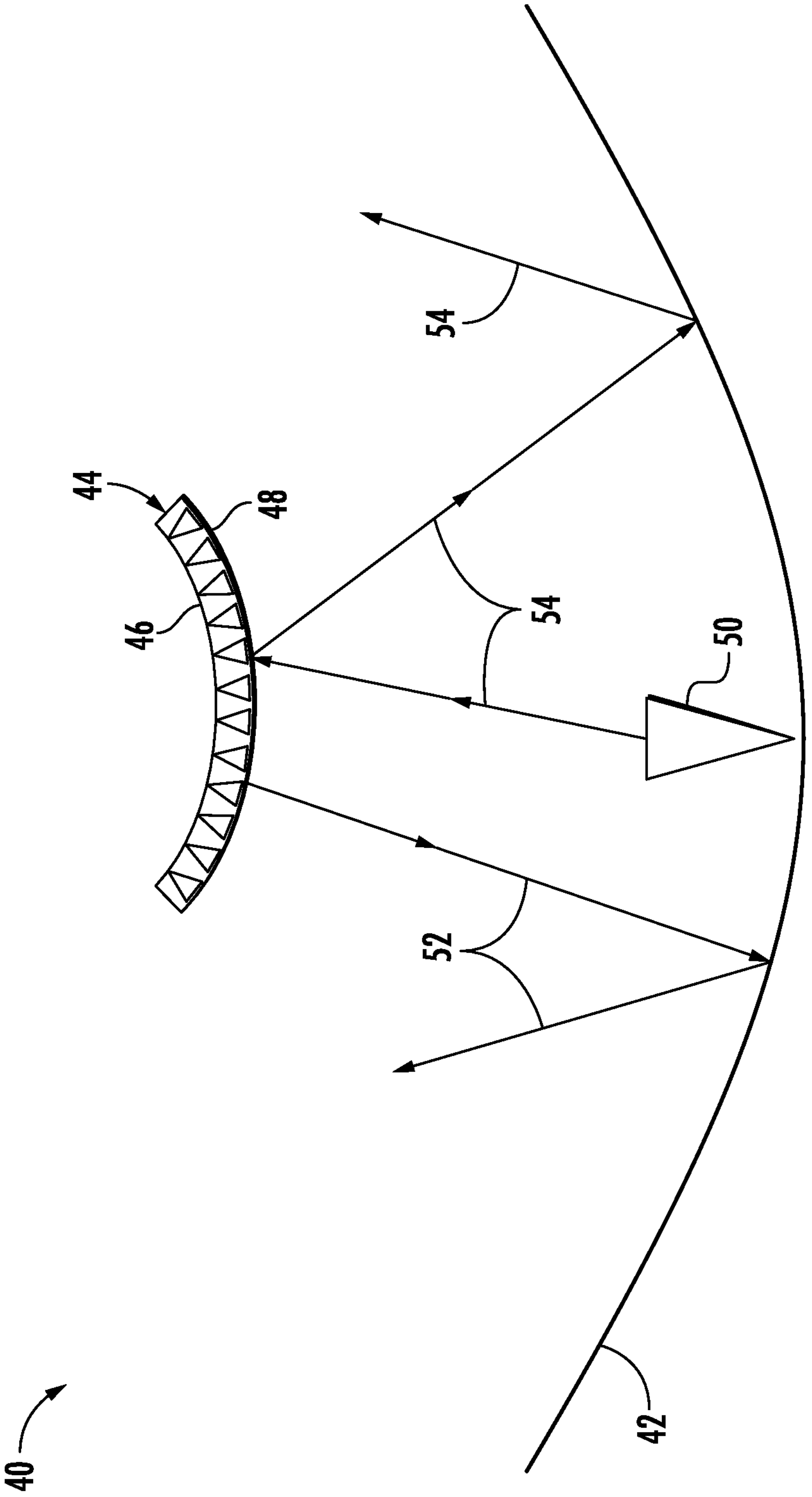
FIG. 2 is a schematic diagram of an antenna with a dual-function antenna structure of the invention.

Referring initially to FIG. 2, an antenna 40 includes an antenna main reflector 42 having a shape defining a focal area, and a dual-function antenna structure 44 at the focal area defining a first antenna feed at a first frequency and an antenna subreflector at a second frequency. A second antenna feed 50 is operable at the second frequency and cooperates with the antenna subreflector and the antenna main reflector 42.

The dual-function antenna structure 44 includes a substrate 46 and an array of antenna elements 48 carried thereby. The array of antenna elements 48 are advantageously configured so that the dual-function antenna structure 44 provides both an antenna feed at the first frequency and an antenna subreflector at the second frequency without requiring a standalone frequency selective surface (FSS) subreflector as discussed in the background.

The antenna 40 may be terrestrial, airborne or space-based (e.g., a satellite). When carried by an aircraft, the antenna 40 may be used in the nose of the aircraft, for example. The antenna main reflector 42 supports a relatively wide bandwidth, such as 0.5-50 GHz, for example. However, a single feed cannot typically cover this entire bandwidth. Instead, two or more antenna feeds are typically used. In the example antenna 40, one antenna feed 50 supports a lower frequency band and the other antenna feed supports a higher frequency band. In other embodiments, an additional antenna feed may be used to support a third frequency band.

The antenna 40 is thus configured as a dual band reflector antenna supporting two different frequency bands. The frequency bands include the low frequency band and the high frequency band. The first antenna feed may be configured to support the high frequency band, and the second antenna feed 50 may be configured to support the low frequency band. For illustration purposes, the high frequency band may cover 5-50 GHz, and the low frequency band may cover 0.5-5 GHz.

First frequency radio signals 52 generated by the first antenna feed are reflected by the antenna main reflector 42. Second frequency radio signals 54 generated by the second antenna feed 50 are reflected by the antenna subreflector which are then reflected by the antenna main reflector 42. The second antenna feed 50 functions as a Cassegrain feed.

The array of antenna elements 48 carried by the substrate 46 operates as a phased array. In some embodiments, the first antenna feed may be scannable with a beam-forming network coupled to the array of antenna elements 48.

The antenna elements 48 may be loop antennas, horn antennas, patch antennas, helical antennas, or dipole antennas, for example. The second antenna feed 50 may be configured as an array of antenna elements (i.e., a phased array) or as a single antenna element. An array element(s) for the second antenna feed 50 may also be a loop antenna, a horn antenna, a patch antenna, a helical antenna or a dipole antenna, for example.

As will be described in greater detail below, the dual-function antenna structure 44 advantageously provides a dual-function based on the planar metallization of the array of antenna elements 48 on the curved substrate 46, and based on the capacitive coupling between adjacent antenna elements 48. This allows the array of antenna elements 48 to function as an antenna feed at the first frequency and to function as a subreflector at the second frequency.

In one embodiment, the array of antenna elements 48 may be configured to passively define the antenna subreflector at the second frequency. As noted above, this is inherently based on the planar metallization of the array of antenna elements 48 and the capacitive coupling between adjacent antenna elements 48. This allows the first antenna feed and the second antenna feed 50 to simultaneously operate.

In another embodiment, the array of antenna elements 48 may be configured to actively define the antenna subreflector at the second frequency. As will be described in greater detail below, this is accomplished using a plurality of controllable switches associated with the array of antenna elements 48. Controlling the switches to turn on causes a short between antenna feeds of the antenna elements 48 and between adjacent antenna elements. Consequently, the first antenna feed do not operate when the switches are activated.

Figure 3:
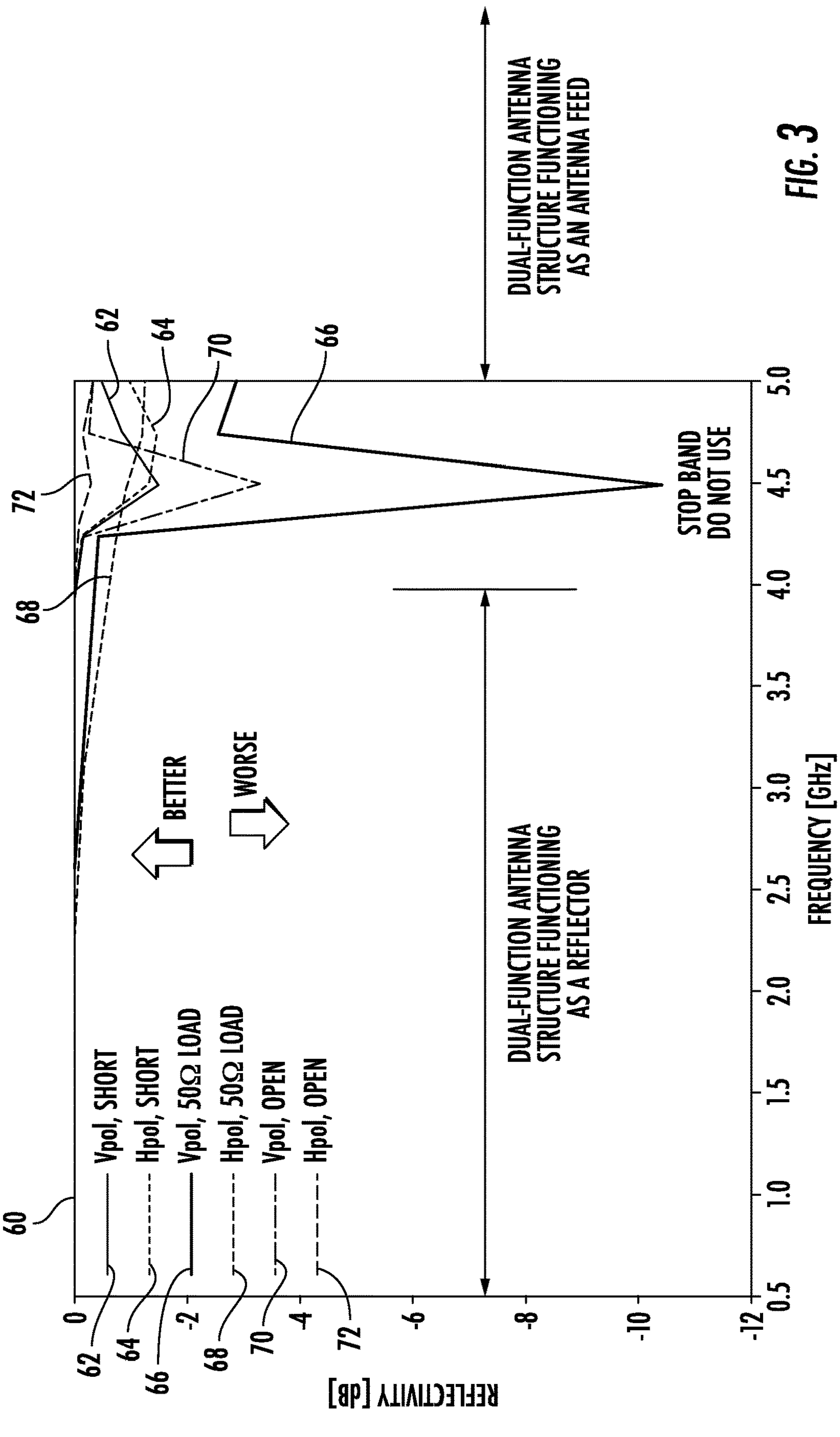
FIG. 3 is a plot of reflectivity versus frequency for the dual-function antenna structure as illustrated in FIG. 2.

A plot 60 of reflectivity versus frequency for the dual-function antenna structure 44 will be discussed in reference to FIG. 3. The plot 60 corresponds to the array of antenna elements 48 being configured as dipole antenna elements defined in a printed conductive layer. As will be discussed in greater detail below, the dual-function antenna structure 44 may be referred to as a current sheet array where the electric current is confined to a surface rather than being spread through a volume of space.

As noted above, the low frequency band (i.e., first frequency) may cover 0.5-5 GHz and the high frequency (i.e., second frequency) band may cover 5-50 GHz. The dual-function antenna structure 44 operates as the first antenna feed in the high frequency band and the antenna subreflector in the low frequency band.

The plot 60 of reflectivity versus frequency includes different load conditions of the array of antenna elements 48. The different load conditions are provided for vertical polarization and for horizontal polarization. The different load conditions include the feeds of the array elements being shorted together, the feeds of the array elements having a normal 50 ohm load, and the feeds of the array elements being open.

Solid line 62 is for the feeds being shorted together for vertical polarization, and dashed line 64 is for the feeds being shorted together for horizontal polarization. Solid line 66 is for the feeds being connected to a 50 ohm load for vertical polarization, and dashed line 68 is for the feeds being connected to a 50 ohm load for horizontal polarization. The 50 ohm load represents normal operation of the dual-function antenna structure 44. Solid line 70 is for the feeds being open for vertical polarization, and dashed line 72 is for the feeds being open for horizontal polarization.

There is a transition band between 4-5 GHz for the dual-function antenna structure 44 operating as the antenna subreflector in the low frequency band and operating as the first antenna feed in the high frequency band. The transition band between 4-5 GHz may be referred to as a stop band and is not used by the antenna 40.

Solid line 66 and dashed line 68 represent normal operation of the dual-function antenna structure 44. In passive operation, the transition between the antenna subreflector and the first antenna feed is passively achieved. This is based on the planar metallization of the array of antenna elements 48 and the capacitive coupling between adjacent antenna elements 48 on the printed conductive layer. Passive operation of the dual-function antenna structure 44 allows the first antenna feed and the second antenna feed 50 to simultaneously operate.

To minimize or reduce the transition band, controllable switches may be used to short the feeds of the dipole antenna elements and to short the capacitive coupling between adjacent dipole antenna elements. This is a method to actively configure the dual-function antenna structure 44 as the antenna subreflector. The use of switches correspond to solid line 62 and dashed line 64 where the feeds are actively shorted together along with the capacitive coupling between adjacent dipole antenna elements. This means the first antenna feed does not operate when the antenna subreflector is operating based on the switches being closed.

Figure 4:
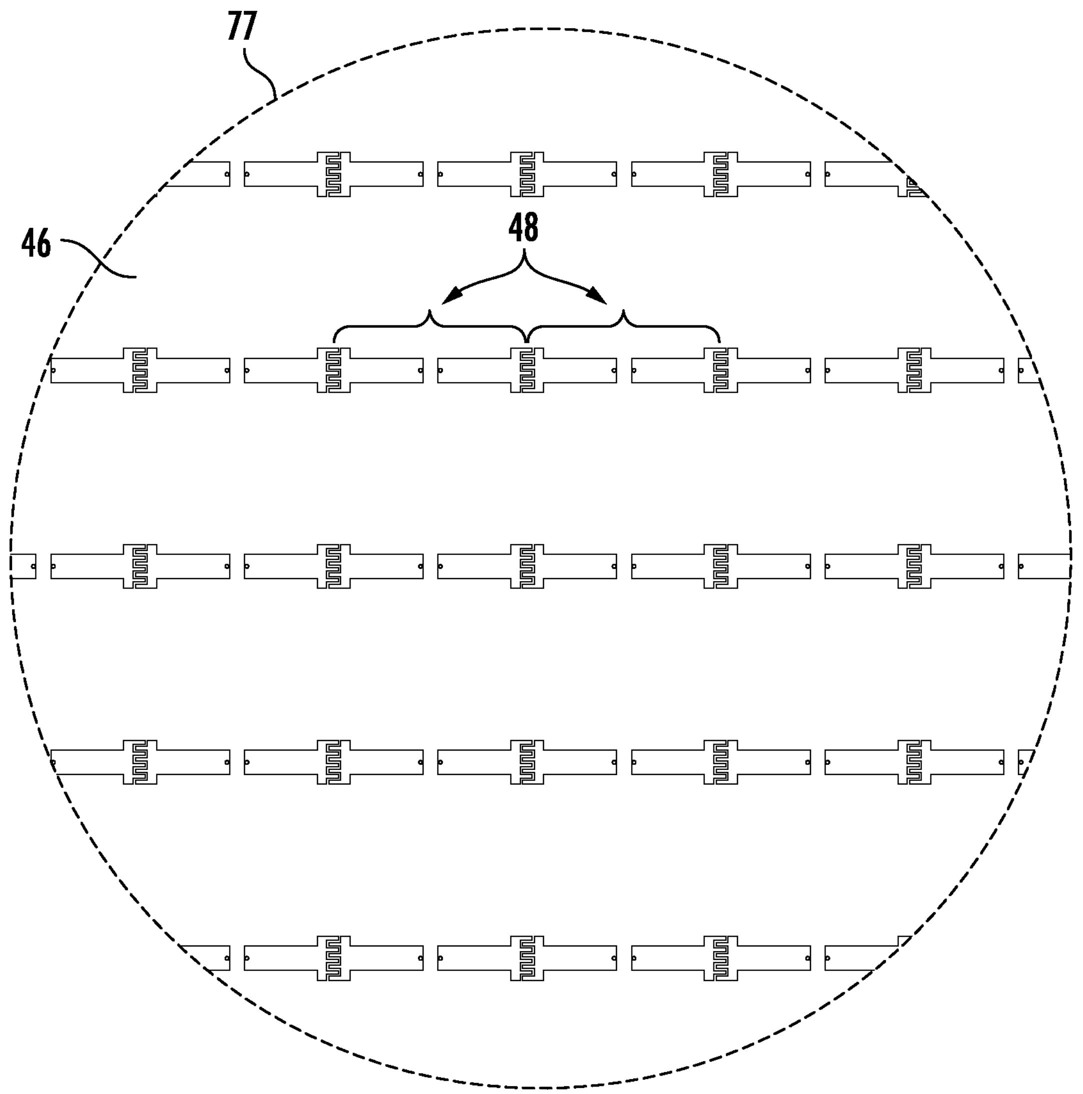
FIG. 4 is a partial schematic diagram of the array of antenna elements illustrated in FIG. 2 shown as dipole antenna elements and configured to provide singular polarization.
Figure 5:
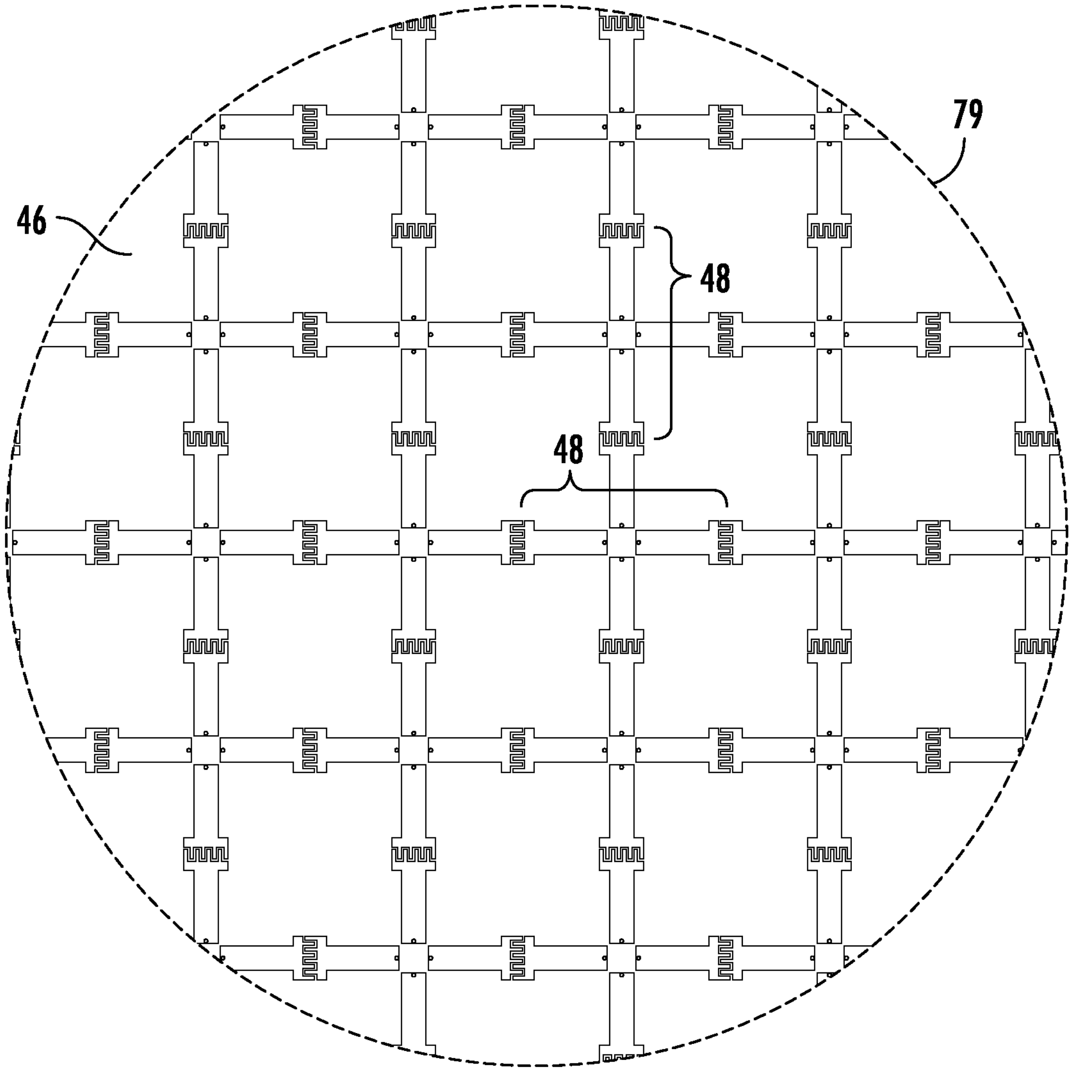
FIG. 5 is a partial schematic diagram of the array of antenna elements illustrated in FIG. 2 shown as dipole antenna elements and configured to provide dual polarization.

Referring now to FIGS. 4 and 5, partial schematic diagrams 77, 79 of the array of antenna elements 48 will be discussed. The array of antenna elements 48 are shown as dipole antenna elements defined in a printed conductive layer, with the printed conductive layer positioned on a flexible substrate 46. Partial schematic diagram 77 includes a first set of dipole antenna elements 48 configured to provide singular polarization, whereas partial schematic diagram 79 includes first and second sets of dipole antenna elements 48 configured to provide dual polarization.

Figure 6A:
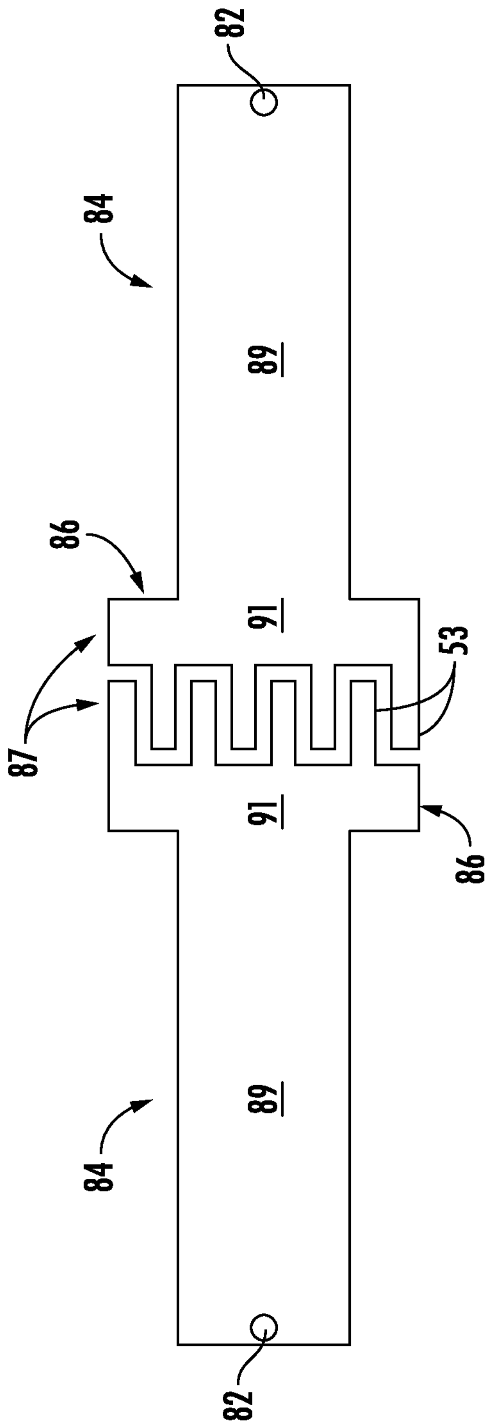
FIGS. 6A and 6B are example embodiments of the dipole antenna elements illustrated in FIGS. 4 and 5, respectively.
Figure 6B:
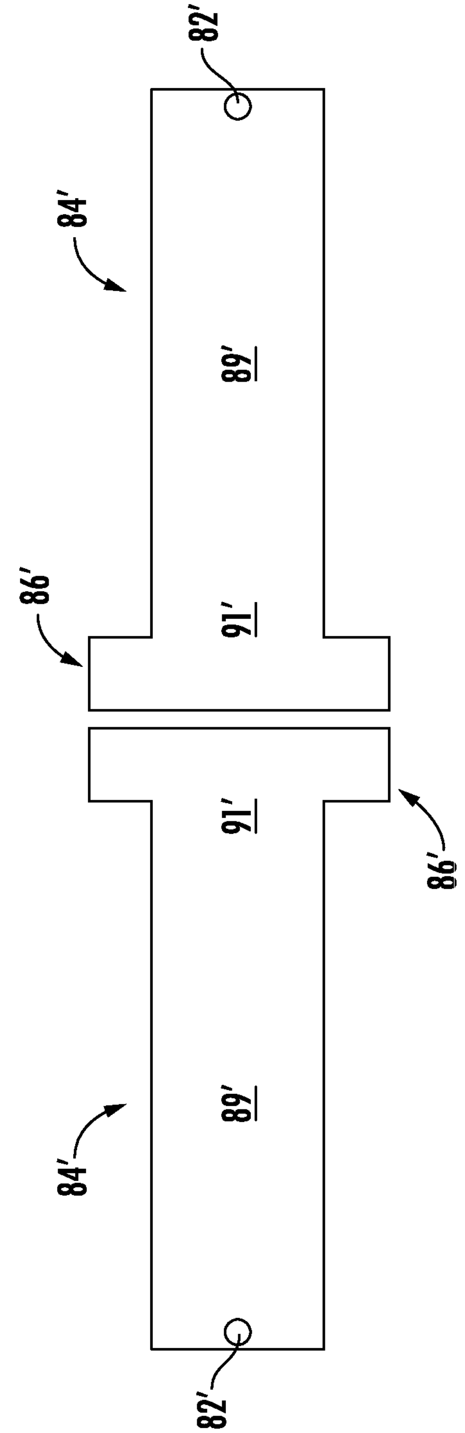

Example embodiments of the dipole antenna elements 48 are shown in FIGS. 6A and 6B. Each dipole antenna element 48 has a medial feed portion 82 and a pair of legs 84 extending outwardly therefrom, with adjacent legs 84 of adjacent dipole antenna elements 48 including respective spaced apart end portions 86 having shapes and relative positioning to provide capacitive coupling between the adjacent dipole antenna elements 48.

As shown in FIG. 6A, the spaced apart end portions 86 in adjacent legs 84 have overlapping or interdigitated portions 87. Each leg 84 comprises an elongated body portion 89, an enlarged width end portion 91 connected to an end of the elongated body portion, and a plurality of fingers 53, e.g. four, extending outwardly from the enlarged width end portion 91.

The capacitive coupling provided by interdigitated portions 87 brings broad bandwidth to the antenna by avoiding the resonances associated with individual isolated dipole antennas. Indeed the interdigited portion 87 capacitive coupling causes the array of antenna elements 48 to emulate a continuous sheet of current. Capacitive coupling is measured in ohms of reactance –jx and the required capacitive coupling reactance value in some instances at the lowest frequency of operation may be 100 to 400 ohms in value.

Alternatively, as shown in FIG. 6B, adjacent legs 84' of adjacent dipole antenna elements may have respective spaced apart end portions 86' to provide increased capacitive coupling between the adjacent dipole antenna elements. In this embodiment, the spaced apart end portions 86' in adjacent legs 84' comprise enlarged width end portions 91' connected to an end of the elongated body portion 89' to provide the increased capacitive coupling between the adjacent dipole antenna elements. Of course other arrangements which increase the capacitive coupling between the adjacent dipole antenna elements may also be possible.

The array of dipole antenna elements 48 are sized and relatively positioned so that the first antenna feed may be operable over a frequency range of 5-50 GHz. Preferably, a size of each dipole antenna element 48 is less than ⅓ of the wavelength of the highest operating frequency. At the lowest operating frequency the layer 122 may be 2 wavelengths or more in extent.

Figure 7:
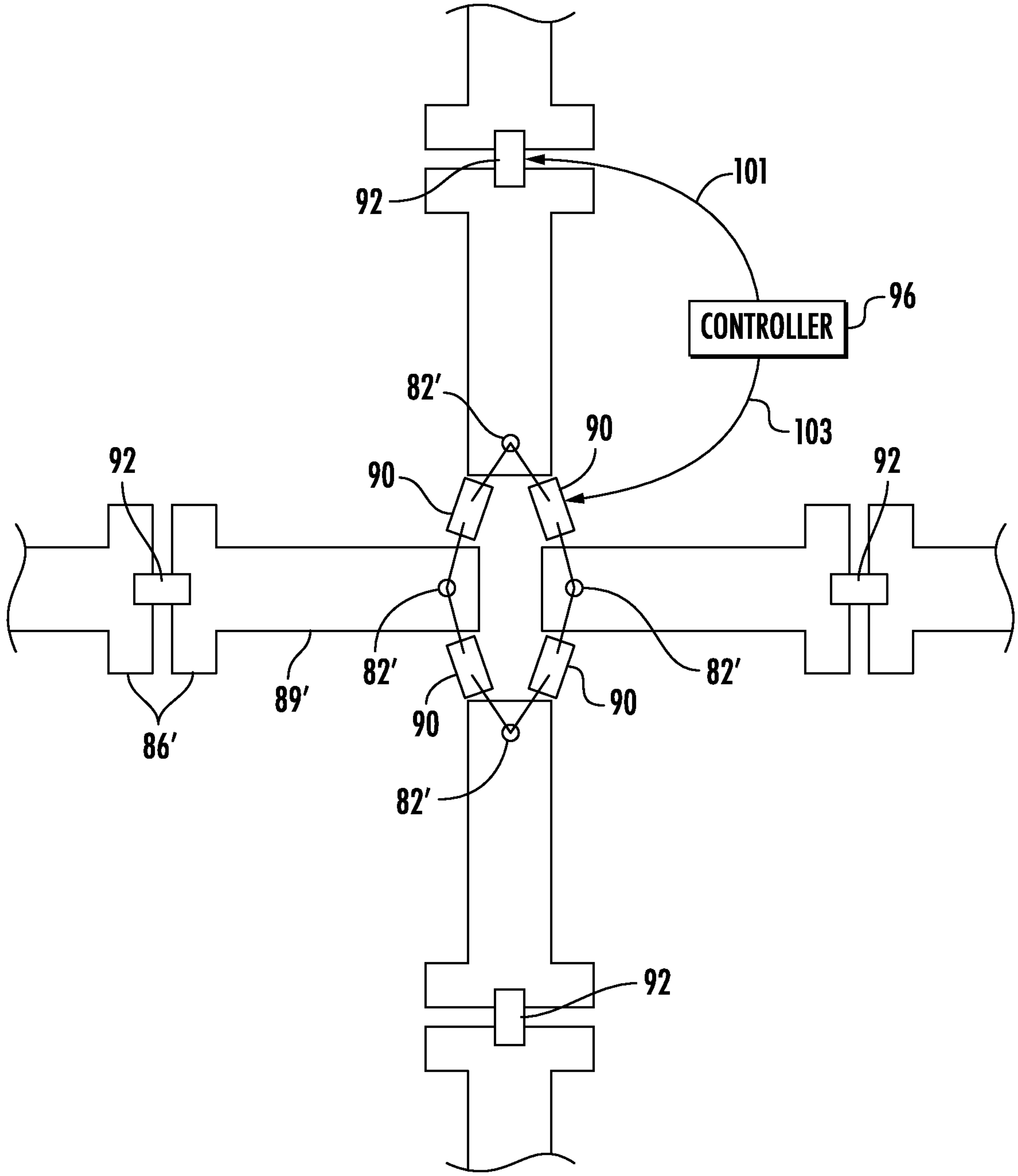
FIG. 7 is a partial schematic diagram of the dipole antenna elements illustrated in FIG. 5 with controllable switches associated therewith.

As discussed above, controllable switches 90, 92 as now shown in FIG. 7 may be used to operate the dual-function antenna structure 44 as an antenna subreflector at the second frequency. Switches 90 are connected across the feeds 82' on adjacent legs 84' of adjacent dipole antenna elements 48. Switches 92 are connected across the respective spaced apart end portions 86' between adjacent dipole antenna elements 48.

The switches may be micro-electromechanical systems (MEMS), for example. A MEMS device may be an electrostatically actuated, micromachined cantilever beam switching element. When applying a voltage between a fixed electrode and a movable electrode, an electrostatic force is generated and it pulls in the movable electrode (actuator). Unlike conventional relays an electromagnet is not required. When the driving voltage becomes OFF, the electrostatic force will disappear, and then the actuator will go back to the original position because of a self-restoring force. As little electric current flow is required by the MEMS switches they may be controlled by high resistance carbon fiber wiring that does not interact with the antenna or associated radio frequency structures. Other types of switches may be used in addition to MEMS devices.

A controller 96 is configured to operate the switches 90, 92. In one embodiment, all of the switches 90, 92 may be operated at the same time. In another embodiment, a selected portion of the switches 90, 92 may be operated. Control wire 101 is connected to switches 90, and control wire 103 is connected to switches 92. To simplify the drawing, the control wires 101, 103 are only shown being connected to one switch each even though each of the switches 90, 92 would have a connection to one of the respective control wires 101, 103. The selected portion of switches may be a portion of only switches 90, or a portion of only switches 92, or a selected combination portion of both switches 90, 92.

The control wires 101, 103 may be a resistive carbon wire. A carbon wire may be less susceptible to RF interference. The MEMS devices draw very little electrical current.

Figure 8:
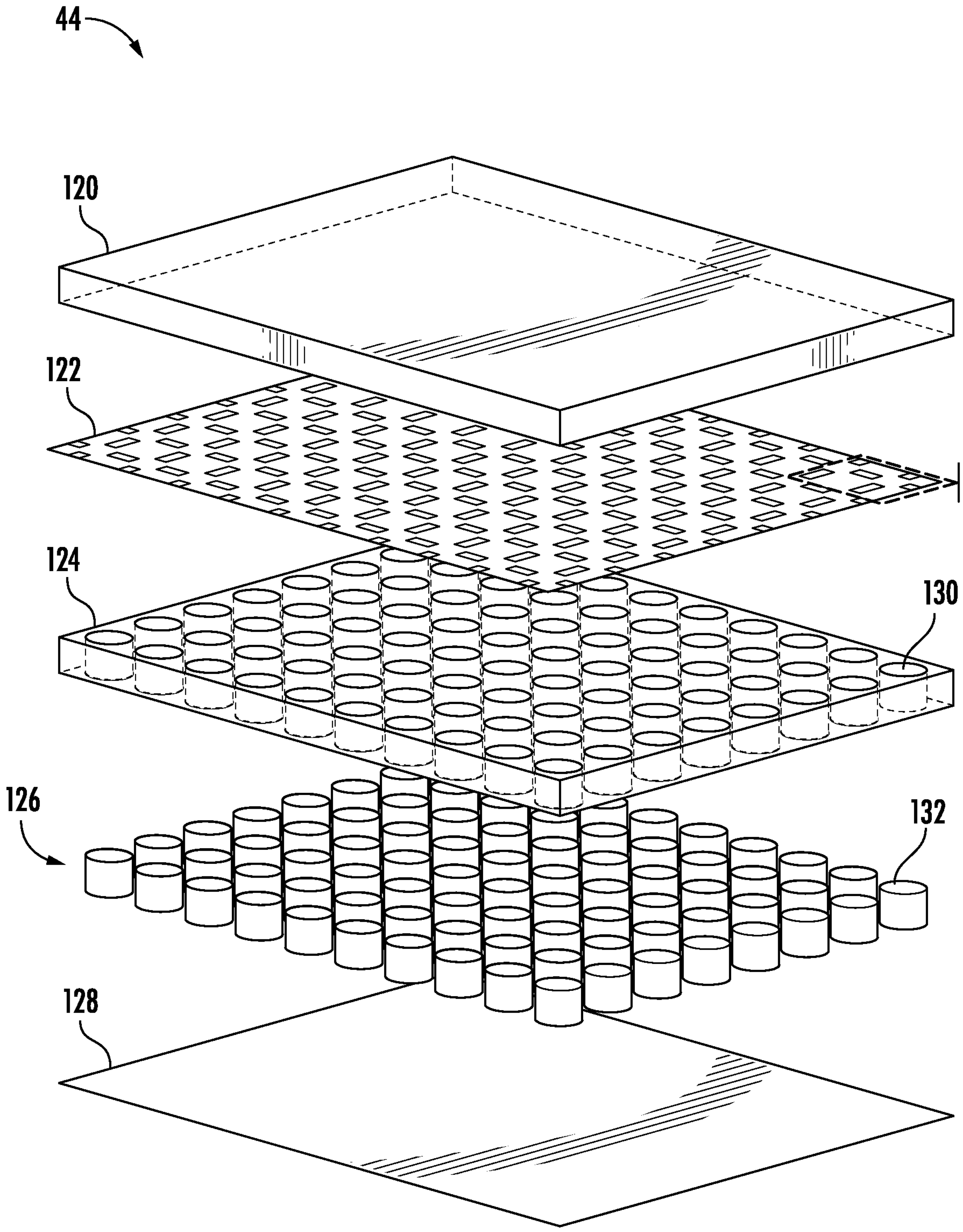
FIG. 8 is an exploded schematic view of the dual-function antenna structure illustrated in FIG. 2.

Referring now to FIG. 8, an exploded view of the dual-function antenna structure 44 will be discussed. The dual-function antenna structure 44 is based on a current sheet construction since electric current is confined to a surface rather than being spread through a volume of space.

Upper layer 120 is a dielectric layer used for adjusting impedances between the radio waves and the feeds 82 of the dipole antenna elements 48. The feeds 82 of the dipole antenna elements 48 may require lower driving resistances of 50 or 188 ohms yet the impedance of the radio waves is normally 377 ohms. Closely coupled dipole arrays without ground plane reflectors may result in feed gap driving resistances of 377 ohms. The upper layer 120 is configured as a sheet of Teflon or light plastic, and may also be referred to as a dielectric matching transformer or a wave matching transformer. Layer 120 is above layer 122 which is the dipole antenna elements 48 carried by the substrate 46. In some instances artificial dielectrics or metamaterial dielectrics may be used to constitute the upper layer 120, such artificial dielectrics can constitute metal squares on a printed wiring board (PWB).

Layer 124 is a low dielectric layer with a plurality of openings 130 that are sized to receive the feed organizers 132 shown in layer 126. The feed organizers 132 provide signals to and receive signals from the feeds 82 of the dipole antenna elements 48. For dual polarization, a feed organizer 132 carries four coaxial cables since a pair of dipole antenna elements 48 are orthogonally positioned with respect to one another. The dashed corner area corresponds to positioning of one of the feed organizers 132.

Figure 10:
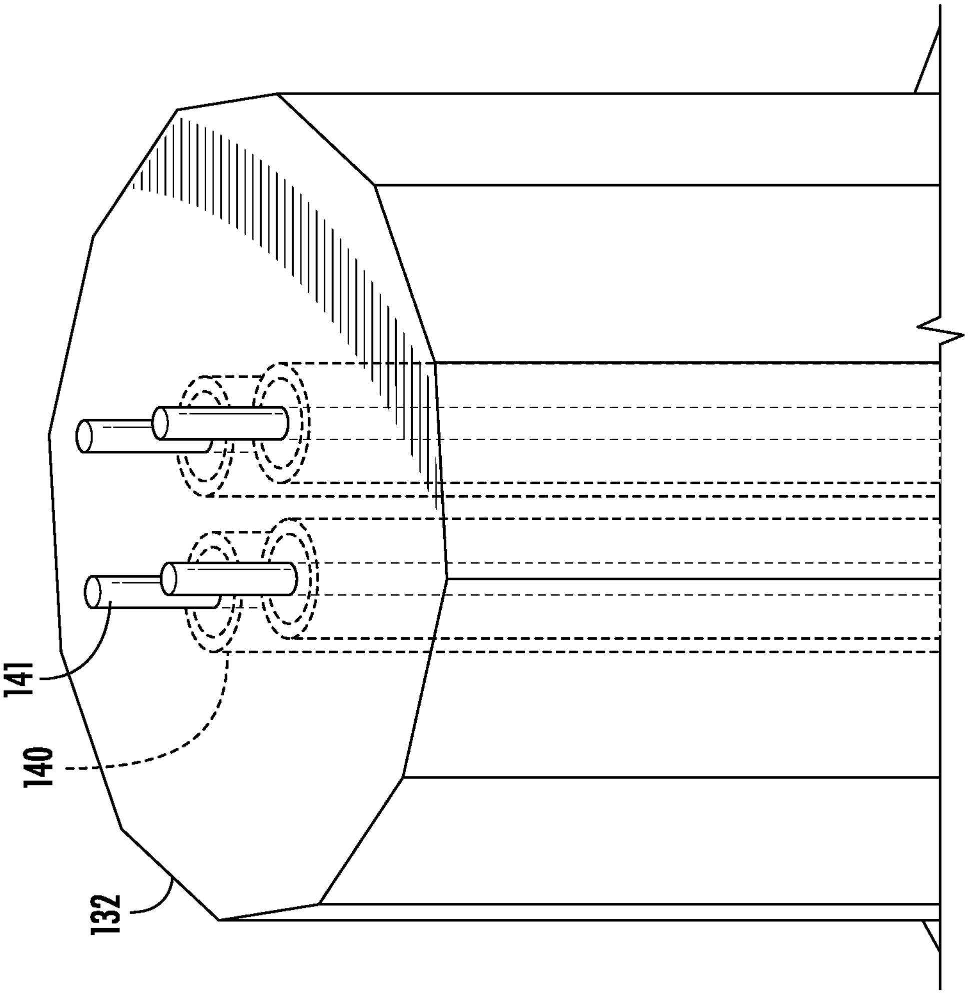
FIG. 10 is an enlarged view of one of the feed organizers illustrated in FIG. 8 with coaxial cables positioned therein.
Figure 9:
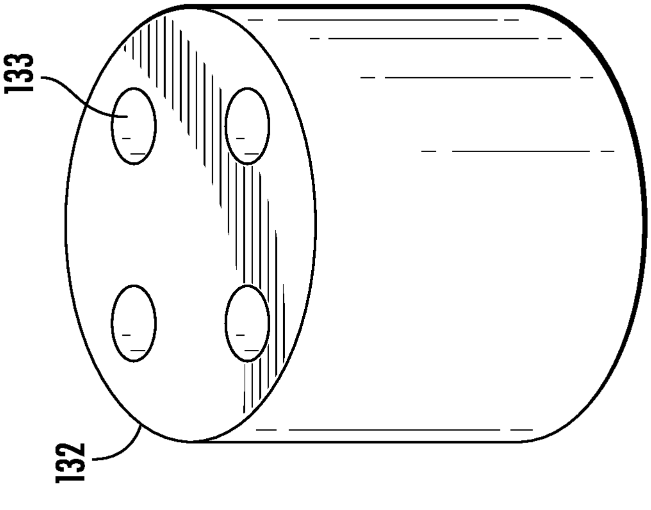
FIG. 9 is an enlarged view of one of the feed organizers illustrated in FIG. 8.

An enlarged view of a feed organizer 132 without the coaxial cables is provided in FIG. 9, and an enlarged view of the feed organizer 132 with the coaxial cables 140 is provided in FIG. 10. The feed organizers 132 are positioned between layer 128, which is a ground plane, and layer 122 having the dipole antenna elements 48.

The feed organizers 132 also help keep unwanted electrical currents such as common mode currents from flowing back down over the outside of the coaxial cables 140. Coaxial cables 140 may exhibit the behavior where current can flow back down over the outside of the shield of a coaxial cable 140. By running the coaxial cables 140 through feed organizers 132, this may keep the coaxial cables 140 from having unwanted radiating properties. The coaxial cables 140 convey electric currents between the radio frequency electronics and the antenna, but they do not themselves radiate.

The feed organizers 132 also help keep unwanted electrical currents from flowing back down over the outside of the coaxial cables 140. Coaxial cables 140 may exhibit the behavior where current can flow back down over the outside of the shield of a coaxial cable 140. By running the coaxial cables 140 through feed organizers 132, this may keep the coaxial cables 140 from having unwanted radiating properties. The coaxial cables 140 deliver electric control signals, but they do not themselves radiate.

The current sheet arrangement may also be referred to as a differential feed current sheet. Each of the coaxial cables 140 in the feed organizers 132 are successive in phase: 0, 90°, 180° and 270°. This may also be referred to as phase quadrature. The coaxial cables 140 may all have the same power so they are equal in amplitude. Pairs of the coaxial cables 140 may act as two electrical current sources in series with each other usefully halving the driving resistances of the feeds 132.

Another aspect is directed to a method for making a dual-function antenna structure 44 to be positioned at a focal area of a main reflector 42. The main reflector 42 has a second antenna feed 50 associated therewith and is operable at a second frequency. The method includes forming an array of antenna elements 48 on a substrate 46 to define a first antenna feed at a first frequency and an antenna subreflector at the second frequency.

Figure 11:
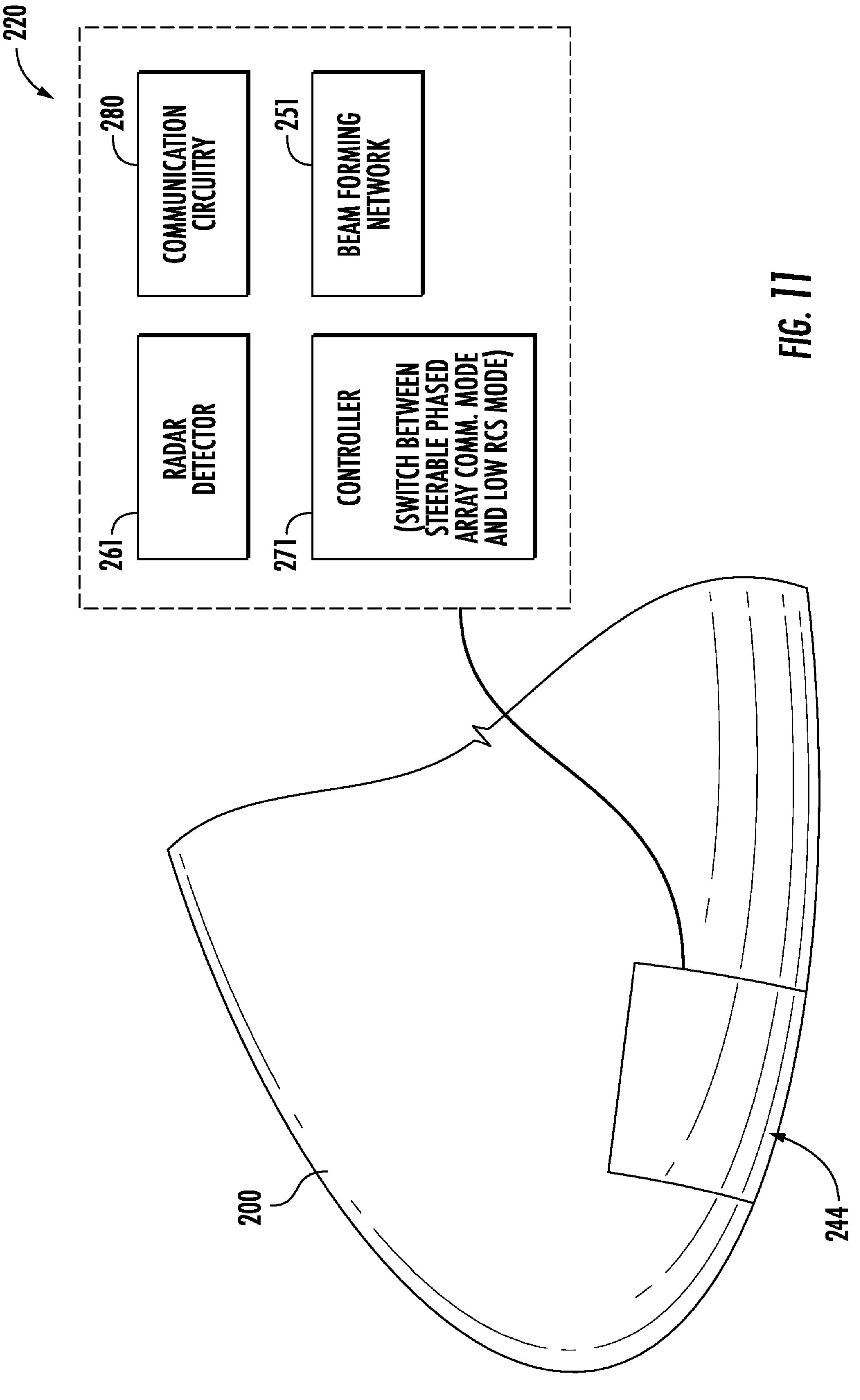
FIG. 11 is a schematic diagram of a system carried by a vehicle that includes another embodiment of the dual-function antenna structure of the invention.

Referring now to FIG. 11, another aspect of the present description is directed to a system 220 to be carried by a vehicle 200, such as an aircraft. In addition to the vehicle 200 being an airborne vehicle, the vehicle 200 may be land-based, water-based or space-based.

The system 200 includes a dual-function antenna structure 244, a beam forming network 251, a radar detector 261, a controller 271, and communication circuitry 280. Certain reference numbers as used above will also be used below but will be preceded by a 2 to refer to like elements.

The dual-function antenna structure 244 is operable between a steerable phased array communication mode and a low radar cross section (RCS) mode. In the steerable phased array communication mode, communication signals may be transmitted and/or received by the dual-function antenna structure 244. In the low RCS mode, a radar cross section of the dual-function antenna structure 244 is reduced in order to be less detectable by radar. Communication signals are not transmitted or received by the dual-function antenna structure 244 in the low RCS mode.

The beam forming network 251 is coupled to the dual-function antenna structure 244 and to the communication circuitry 280. The radar detector 261 is configured to detect radar signals being directed to the vehicle 200. The controller 271 is configured to control the dual-function antenna structure 244 to switch between the steerable phased array communication mode and the low RCS mode responsive to the radar detector 261 detecting radar signals. In other embodiments, the radar detector 261 may be external the vehicle 200 but is in communications with the controller 271.

The dual-function antenna structure 244 includes a substrate 246 and an array of antenna elements 248 carried thereby. The antenna elements 248 may be dipole antenna elements defined in a printed conductive layer, with the printed conductive layer positioned on a flexible substrate 246. The antenna elements 48 may be sized to operate within the UHF frequency range (0.3-3 GHz), for example. The dipole antenna elements 248 may include a first set of dipole antenna elements configured to provide singular polarization (as shown in FIG. 4), or to include first and second sets of dipole antenna elements configured to provide dual polarization (as shown in FIG. 5).

Figure 12:
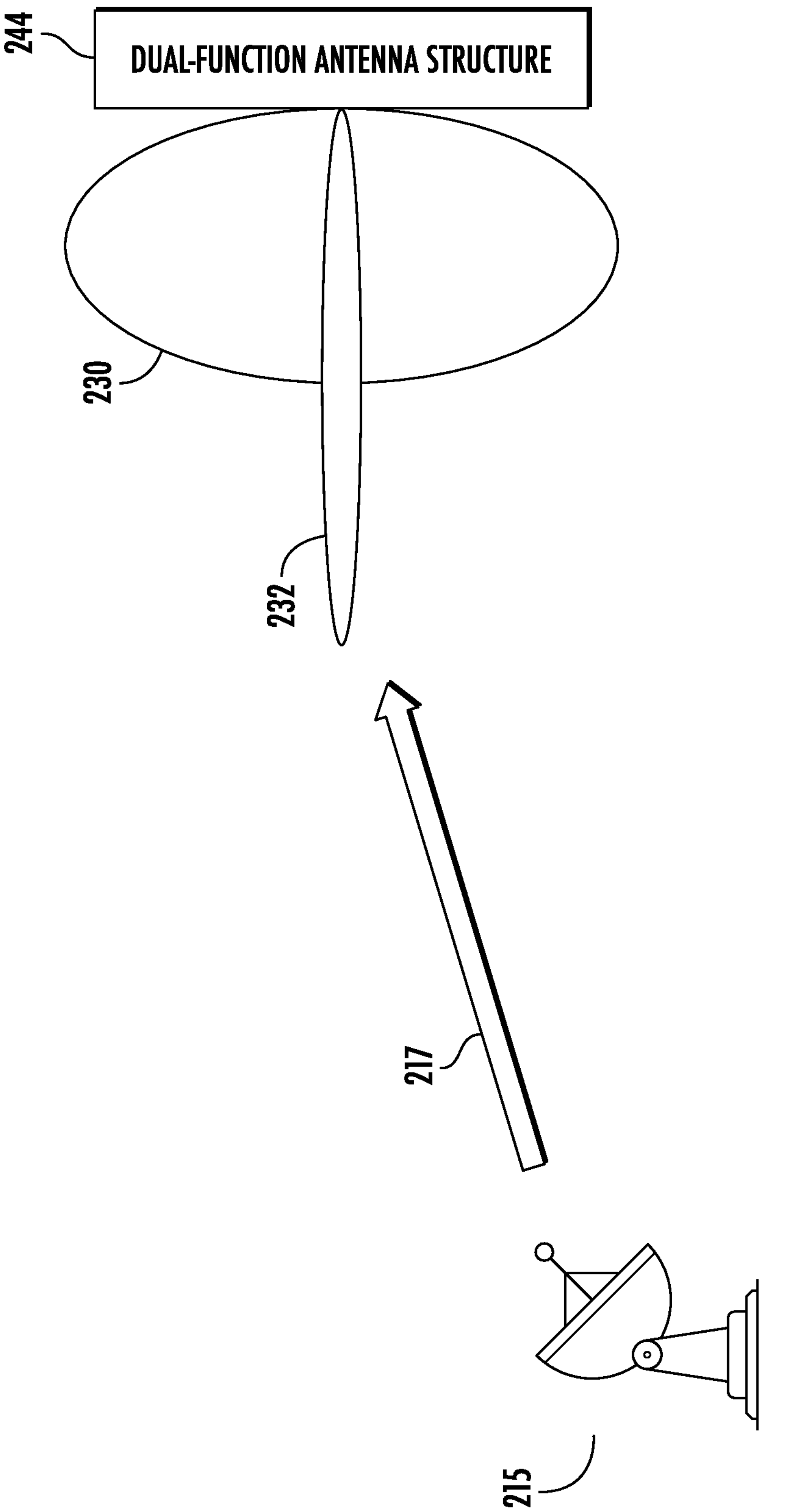
FIG. 12 is a plot of different radar return antenna patterns for the dual-function antenna structure illustrated in FIG. 11.
Figure 13:
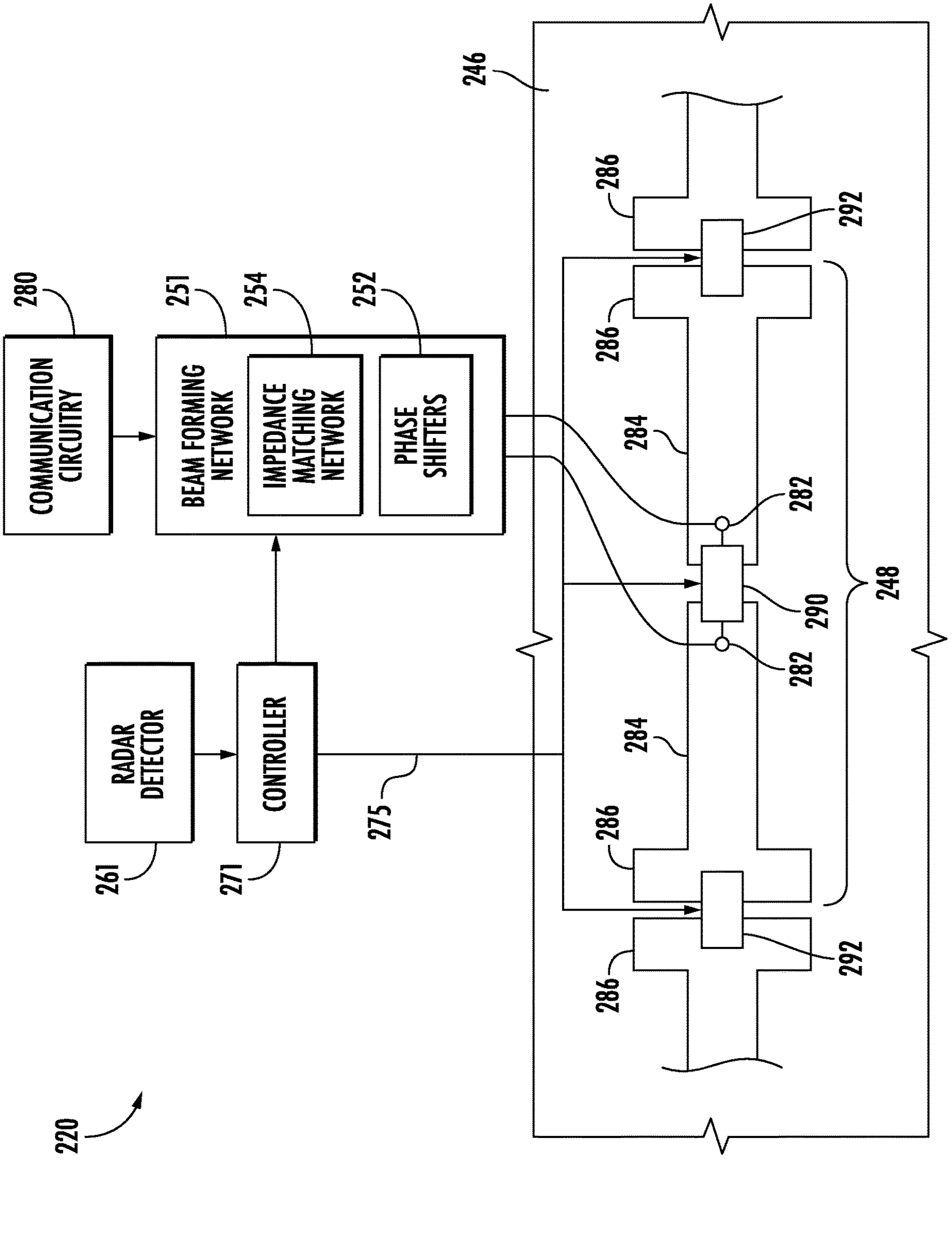
FIG. 13 is a detailed schematic diagram of the system illustrated in FIG. 11 for one embodiment of placing the dual-function antenna structure in a low RCS mode.
Figure 14:
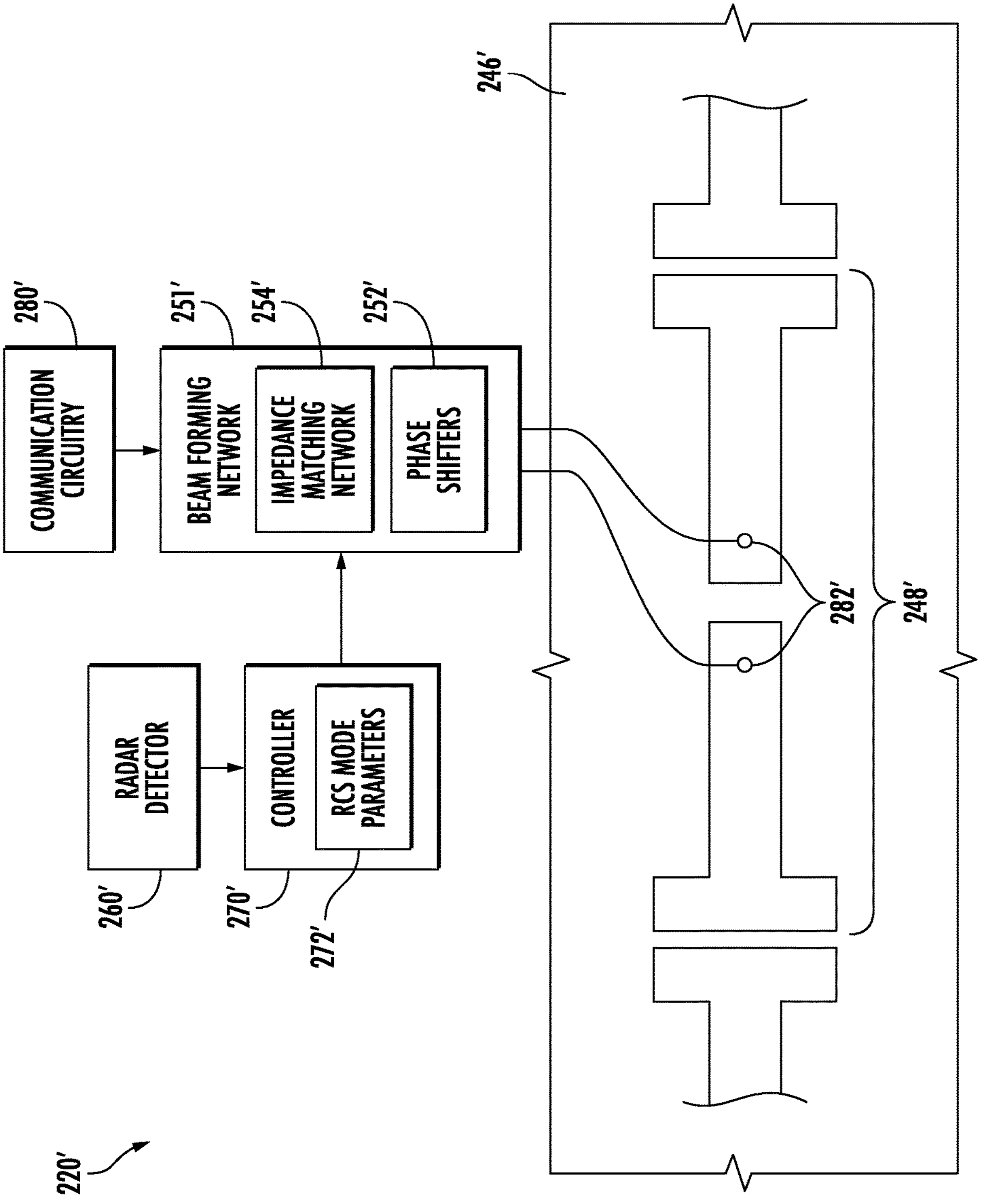
FIG. 14 is a detailed schematic diagram of the system illustrated in FIG. 11 for another embodiment of placing the dual-function antenna structure in a low RCS mode.

Referring now to FIGS. 12-14, the dual-function antenna structure 244 has different radar cross section (RCS) antenna patterns 230, 232 depending on how the feeds of the dipole antenna elements 248 are being loaded. The beam forming network 251 includes controllable phase shifters 252 for steering an antenna beam by adjusting the phase of the dipole antenna elements 248. The beam forming network 251 also includes an impedance matching network 254 for matching input impedances of the dipole antenna elements 248 with the output impedances of RF circuitry (e.g., power amplifiers) used to drive the dipole antenna elements 248.

The RCS antenna patterns 230, 232 are generated in response radar signals 217 being received by the dual-function antenna structure 244 from a radar 215. Reflection of incident radar signals 217 received by the dual-function antenna structure 244 varies between the different RCS antenna patterns 230, 232. Antenna pattern 230 will be referred to as an antenna mode RCS scattering pattern, and antenna pattern 232 will be referred to as a structural mode RCS scattering pattern.

The antenna mode RCS scattering pattern 230 corresponds to when the dual-function antenna structure 244 is in the steerable phased array communication mode. In this mode, the feeds of the dipole antenna elements 248 are connected to a 50 ohm load. The antenna mode RCS scattering pattern 230 has a broad pattern, which typically results in a broad glint (i.e., strong response) being displayed on a radar display. This makes it easier for the radar 215 to receive signals reflected by the dual-function antenna structure 244.

The structural antenna mode RCS pattern 232 corresponds to when the dual-function antenna structure 244 is in the low RCS mode. In the low RCS mode, the feeds of the dipole antenna elements 248 are shorted together. The structural antenna mode RCS pattern 232 has a narrow beam, which typically results in a small blip being displayed on a radar display. This makes it harder for the radar 215 to receive signals reflected by the dual-function antenna structure 244.

In system 220, one approach for switching the dual-function antenna structure 244 to the low RCS mode is based on controllable switches 290, 292, as shown in FIG. 13. Controlling the switches 290, 292 to turn on causes a short between feeds 282 of the antenna elements 248 and between ends of adjacent antenna elements 286. The dual-function antenna structure 244 functions as a metal plate when the switches 290, 292 are closed. As a result, the narrow structural mode RCS scattering pattern 232 is present instead of the broad antenna mode RCS scattering pattern 230.

Switches 290 are connected across the feeds 282 on adjacent legs 284 of adjacent dipole antenna elements 248. Switches 292 are connected across the respective spaced apart end portions 286 between adjacent dipole antenna elements 248. As noted above, the switches 290, 292 may be micro-electromechanical systems (MEMS) devices, for example.

The controller 271 is configured to operate the switches 290, 292 in response to the radar detector 261 detecting radar signals being directed towards the vehicle 200. Control wire 275 is used to close the switches 290, 292 at the same time.

In system 220', another approach for switching the dual-function antenna structure 244' to the low RCS mode is based on control of the phase shifters 252' in the beam forming network 251'. The impedance matching network 254' is used to control the phase shifters 252' so that a phase of the structural mode RCS scattering pattern 232 is 180 degrees out of phase with the antenna mode RCS scattering pattern 230. RCS mode parameters 272' of the impedance matching network 254' are determined ahead of time based on computation analysis. The RCS mode parameters 272' may be stored in the controller 271', as shown, or in the beam forming network 251'.

The computation analysis includes determining the total radar return $\sigma_{total}$ of the dual-function antenna structure 244', which is based on the following equation:

$$\sigma_{total}=\sigma_{SC}+\sigma_{RL}$$

The total reflectivity value $\sigma_{total}$ takes into account all contributing factors in the radar return.

The value of $\sigma_{SC}$ represents the radar cross section of the dual-function antenna structure 244' when there is a short between feeds 282' of the antenna elements 248' and between adjacent antenna elements 286'. This corresponds to the antenna mode RCS scattering pattern 230. The amplitude and phase of the scattered return is measured in the frequency domain using a network analyzer. Phase β is on the x-axis and amplitude α is on the y-axis.

The value $\sigma_{RL}$ represents the radar cross section of the dual-function antenna structure 244' when the feeds 282' of the antenna elements 248' have a maximum power transfer loading impedance. This corresponds to the structural mode RCS scattering pattern 232. The amplitude and phase of the scattered return is also measured in the frequency domain using a network analyzer.

The beam forming network 251' includes an impedance matching network 254', which may also be referred to as an impedance transformer. The impedance matching network 254' is used to create a matched impedance between the power amplifiers in the communication circuitry 280' and the dipole antenna elements 248'. The impedance matching network 254' is well suited to operate a large number of regularly spaced dipole antenna elements 248'.

The maximum power transfer loading impedance is typically 50 ohms by convention. If the system 220' deviates from convention then the: 1) antenna radiation resistance is equal to the resistive component of the circuit loading impedance, and the 2) reactive component of the antenna impedance is the complex conjugate of the circuit loading impedance (e.g., if the dipole antenna elements 248' are capacitive then the load impedance needs to be proportionally inductive).

The total radar return $\sigma_{total}$ of the dual-function antenna structure 244 may now be written to include the reflection coefficient gamma r of the impedance matching network 254':

$$\sigma_{total} = \sigma_{SC} + \sigma_{RL}(\Gamma_{mn\ loaded})$$

The impedance matching network 254' is based on the following equation, where f is a function to be determined by measurement.

$$\Gamma_{mn\ loaded} = f\ (\alpha \lfloor \beta)$$

The variable α equals an amplitude response of the impedance matching network 254' associated with a dipole antenna element 248'. The variable β equals a phase response of the impedance matching network 254' associated with the same dipole antenna element 248'.

The impedance matching network 254' may be controlled so that a phase of $\sigma_{SC}$ (structural mode RCS scattering pattern 232) is out of phase with $\sigma_{RL}$ (antenna mode RCS scattering pattern 230). RCS mode parameters 272' of the impedance matching network 254' needed for the beam forming network 251' to operate in the low RCS mode may be determined based on the phases of $\sigma_{SC}$ and $\sigma_{RL}$ adding to 0:

$$\sigma_{SC} + \sigma_{RL}(\Gamma_{mn\ loaded}) = 0$$

The above equation may be arranged as follows:

$$\sigma_{SC} = -\sigma_{RL}\ (\Gamma_{mn\ loaded})$$

The amplitude α and phase β of the phase shifters 252' may now be determined as follows:

$$\Gamma_{mn\ loaded} = f\ (\alpha \lfloor \beta) = \sigma_{SC}/-\sigma_{RL}$$

The determined amplitude α and phase β values define the RCS mode parameters 272'. Consequently, when the dual-function antenna structure 244' is switched to the low RCS mode, the computed amplitude α and phase values β for the impedance matching network 252' are used.

Once the impedance matching network 254' is determined so that the phase of the structural mode RCS scattering pattern 232 is 180 degrees out of phase with the antenna mode RCS scattering pattern 230, then the radar 215 does may not see a radar return or backscatter from the dual-function antenna structure 244'.

However, when the phase of the structural mode RCS scattering pattern 232 and the phase of the antenna mode RCS scattering pattern 230 are not completely cancelled, then the radar 215 may see a reduced radar return or backscatter from the dual-function antenna structure 244'. Also, the reduced radar pattern resulting from the structural and antenna mode cancellation will vary in magnitude as a function of look angle, frequency and polarization.

When the dual-function antenna structure 244' is in the nose of an aircraft, for example, the dual-function antenna structure 244' may be curved. A curved surface antenna will have a low structural radar cross section over a large range of look angles while a flat surface antenna will have a high structure radar cross section over a narrow range of look angles.

Another aspect is directed to a method for operating a system 220 to be carried by a vehicle 200, with the system 220 comprising a dual-function antenna structure 244 that includes a substrate 246 and an array of antenna elements 248 carried thereby, and a beam forming network 251 coupled to the dual-function antenna structure 244. The method may comprise controlling the dual-function antenna structure 244 to switch between a steerable phased array communication mode and a low radar cross section (RCS) mode responsive to a radar detector 261 detecting radar signals being directed to the vehicle 200.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. An antenna comprising:

an antenna main reflector having a shape defining a focal area;

a dual-function antenna structure at the focal area defining a first antenna feed at a first frequency and an antenna subreflector at a second frequency, the dual-function antenna structure comprising a substrate and an array of dipole antenna elements carried thereby, each dipole antenna element comprising a medial feed portion and a pair of legs extending outwardly therefrom, with adjacent legs of adjacent dipole antenna elements including respective spaced apart end portions having shapes and relative positioning to provide capacitive coupling between the adjacent dipole antenna elements; and a second antenna feed adjacent the antenna main reflector and operable at the second frequency to cooperate with the antenna subreflector and antenna main reflector.

2. The antenna of claim 1 wherein the array of dipole antenna elements is configured to passively define the antenna subreflector at the second frequency.

3. The antenna of claim 1 comprising a plurality of controllable switches associated with the array of dipole antenna elements to actively define the antenna subreflector at the second frequency.

4. The antenna of claim 1 comprising a first set of controllable switches configured to couple together the medial feed portions of the dipole antenna elements.

5. The antenna of claim 1 comprising a second set of controllable switches configured to couple together the adjacent end portions of the dipole antenna elements.

6. The antenna of claim 1 wherein each leg comprises an elongated body portion and an enlarged width end portion connected thereto.

7. The antenna of claim 1 wherein the spaced apart end portions in adjacent legs comprise interdigitated portions.

8. The antenna of claim 1 wherein the array of dipole antenna elements comprises a first set of dipole antenna elements arranged to provide singular polarization.

9. The antenna of claim 1 wherein the array of dipole antenna elements comprises first and second sets of orthogonal dipole antenna elements arranged to provide dual polarization.

10. A dual-function antenna structure to be positioned at a focal area of a main reflector, the main reflector having a second antenna feed associated therewith and operable at a second frequency, the dual-function antenna structure comprising:

a substrate and an array of dipole antenna elements carried thereby to define a first antenna feed at a first frequency and an antenna subreflector at the second frequency, each dipole antenna element comprising a medial feed portion and a pair of legs extending outwardly therefrom, with adjacent legs of adjacent dipole antenna elements including respective spaced apart end portions having shapes and relative positioning to provide capacitive coupling between the adjacent dipole antenna elements.

11. The dual-function antenna structure of claim 10 wherein the array of dipole antenna elements is configured to passively define the antenna subreflector at the second frequency.

12. The dual-function antenna structure of claim 10 comprising a plurality of controllable switches associated with the array of dipole antenna elements to actively define the antenna subreflector at the second frequency.

13. The dual-function antenna structure of claim 10 comprising a first set of controllable switches configured to couple together the medial feed portions of the dipole antenna elements.

14. The dual-function antenna structure of claim 10 comprising a second set of controllable switches configured to couple together the adjacent end portions of the dipole antenna elements.

15. The dual-function antenna structure of claim 10 wherein each leg comprises an elongated body portion and an enlarged width end portion connected thereto.

16. The dual-function antenna structure of claim 10 wherein the spaced apart end portions in adjacent legs comprise interdigitated portions.

17. A method for making a dual-function antenna structure to be positioned at a focal area of a main reflector, the main reflector having a second antenna feed associated therewith and operable at a second frequency, the method comprising:

forming an array of antenna elements on a substrate to define a first antenna feed at a first frequency and an antenna subreflector at the second frequency, each dipole antenna element comprising a medial feed portion and a pair of legs extending outwardly therefrom, with adjacent legs of adjacent dipole antenna elements including respective spaced apart end portions having shapes and relative positioning to provide capacitive coupling between the adjacent dipole antenna elements.

18. The method of claim 17 wherein forming the array of dipole antenna elements comprises forming the array of dipole antenna elements to passively define the antenna subreflector at the second frequency.

19. The method of claim 17 comprising coupling a plurality of controllable switches with the array of dipole antenna elements to actively define the antenna subreflector at the second frequency.

* * * * *